United States Patent
Melito

(10) Patent No.: US 10,520,100 B2
(45) Date of Patent: Dec. 31, 2019

(54) DUAL-ALLOY PYROTECHNIC-ACTUATED VALVE ASSEMBLY

(71) Applicant: GE-Hitachi Nuclear Energy Americas LLC, Wilmington, NC (US)

(72) Inventor: Joel Patrick Melito, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 83 days.

(21) Appl. No.: 15/391,931

(22) Filed: Dec. 28, 2016

(65) Prior Publication Data

US 2018/0180188 A1 Jun. 28, 2018

(51) Int. Cl.
| F16K 17/40 | (2006.01) |
| G21C 9/008 | (2006.01) |
| B23P 15/00 | (2006.01) |

(52) U.S. Cl.
CPC .......... F16K 13/06 (2013.01); B23P 15/001 (2013.01); G21C 9/008 (2013.01); *Y02E 30/40* (2013.01)

(58) Field of Classification Search
CPC ......... F16K 13/06; G21C 9/008; B23P 15/001
See application file for complete search history.

(56) References Cited

U.S. PATENT DOCUMENTS

| 2,815,882 A | 12/1957 | Connell |
| 3,260,272 A | 7/1966 | Eckardt |
| 3,587,601 A * | 6/1971 | Shippy ............ F16K 13/06 137/614.21 |
| 3,964,390 A | 6/1976 | Medlock |
| 3,983,892 A | 10/1976 | Hardesty |
| 4,248,257 A | 2/1981 | Hardesty |
| 4,457,328 A * | 7/1984 | Lins ............ F16K 13/04 137/614.13 |
| 4,508,133 A | 4/1985 | Hamid |
| 4,619,284 A | 10/1986 | Delarue et al. |
| 5,443,088 A | 8/1995 | Hoch et al. |
| 7,703,471 B2 | 4/2010 | Edwards |
| 2006/0180201 A1 | 8/2006 | Evans |
| 2009/0314355 A1 | 12/2009 | Szeglin |
| 2010/0288148 A1 | 11/2010 | Ritchie et al. |
| 2012/0234162 A1 | 9/2012 | Tirmizi |
| 2012/0279732 A1 | 11/2012 | Smith et al. |
| 2013/0167377 A1 | 7/2013 | Gillespie |

(Continued)

OTHER PUBLICATIONS

International Search Report and Written Opinion dated Mar. 6, 2018 for corresponding International Application No. PCT/US2017/062940.

*Primary Examiner* — P. Macade Nichols

(74) *Attorney, Agent, or Firm* — Harness, Dickey & Pierce, P.L.C.

(57) ABSTRACT

A pyrotechnic-actuated valve assembly may include an insert body having an inlet, an outlet, and a flow path extending from the inlet to the outlet. The insert body is formed of a first alloy. A shear structure is bonded to the outlet of the insert body so as to close the flow path. The shear structure is formed of a second alloy. The second alloy of the shear structure is bonded to the first alloy of the insert body so as to form a hermetic seal. The dual-alloy nature of the valve assembly allows a relatively clean shearing of the shear structure during actuation, thus reducing or preventing the occurrence of deformation and/or material fragments in the flow path.

18 Claims, 4 Drawing Sheets

(56) References Cited

U.S. PATENT DOCUMENTS

| | | | |
|---|---|---|---|
| 2014/0261748 A1* | 9/2014 | Smith | F16K 13/04 137/68.11 |
| 2016/0153351 A1* | 6/2016 | Turner | F02B 33/32 60/600 |
| 2018/0023463 A1* | 1/2018 | Kemona | F02B 37/186 29/890.08 |

* cited by examiner

DUAL-ALLOY PYROTECHNIC-ACTUATED VALVE ASSEMBLY

BACKGROUND

Field

The present disclosure relates to valves that are actuated by detonating a pyrotechnic charge. Such valves may be used, for example, in safety systems of nuclear power plants.

Description of Related Art

Conventionally, a shear-type pyrotechnic-actuated valve has an insert portion that is integrally formed with a shear portion. In particular, the insert portion and the shear portion are formed as a monolithic structure and, thus, made of the same material. The insert portion may be demarcated from the shear portion by a groove or other feature designed to provide structural vulnerability for the purpose of facilitating a proper shearing action during actuation. The valve is designed to remain in a closed state until actuated. During actuation, a pyrotechnic charge is detonated to shear off the shear portion to open the valve. The magnitude of the detonation required to open the valve will depend on various factors, such as the bore size of the valve. In this regard, large-bore valves require more pyrotechnic charge in general for actuation compared to small-bore valves of the same material. However, a stronger detonation also results in an increased occurrence of deformation to the insert portion and/or material fragments when the shear portion is sheared off to open the valve during actuation. Consequently, the resulting flow through the opened valve may be hindered, distorted, or otherwise disrupted by the deformation, thereby adversely affecting the intended operation of the valve. Furthermore, the presence of material fragments in the flow may damage or otherwise have a detrimental impact on downstream components and structures.

SUMMARY

A pyrotechnic-actuated valve assembly may include an insert body having an inlet, an outlet, and a flow path extending from the inlet to the outlet. The insert body is formed of a first alloy. A shear structure is bonded to the outlet of the insert body so as to close the flow path. The shear structure is formed of a second alloy. The second alloy of the shear structure is bonded to the first alloy of the insert body so as to form a hermetic seal. The insert body may be tapered at the outlet to decrease a contact area with the shear structure.

The insert body may have an outer diameter that is larger than 2 inches. The first alloy and the second alloy have different crystal structures and/or different lattice constants. The first alloy may be a 400 series stainless steel (or other hardenable high-strength martensitic stainless steel alloy). The first alloy may also be a high-strength low-alloy steel. The first alloy may also be an Inconel alloy (or other high-strength nickel alloy). The second alloy is harder than the first alloy. If the pyrotechnic-actuated valve assembly will be used in a nuclear reactor environment, then it will beneficial for the second alloy to be free of cobalt. In addition, the second alloy may contain at least 0.5 weight percent nitrogen. The second alloy may also be one of the alloys identified for the first alloy, as long as the first and second alloys are not of the same material.

A cladding of a third alloy may line the flow path of the insert body. The third alloy has a higher resistance to corrosion than the first alloy and the second. alloy or may be necessary to provide a continuous corrosion-resistant internal fluid boundary consistent with the piping system material in which the pyrotechnic-actuated valve assembly is installed. The third alloy may be a 300 series stainless steel.

A piston is configured to strike and displace the shear structure to open the flow path. A retaining structure may be secured to the shear structure. The retaining structure is configured to permit a displacement of the shear structure while controlling a post-actuation motion and position of the shear structure. A retaining pocket or capture space inside the valve body in which the shear structure is captured (and which permits full displacement of the shear structure out of the fluid path) may also be used with or in place of a retaining structure.

The insert body may be in the form of a nipple, and the shear structure may be in the form of a shear cap. In another example embodiment, the insert body may include a first conduit section and a second conduit section, and the shear structure may be in the form of a shear plug that is between the first conduit section and the second conduit section of the insert body (e.g., bonded between the inlet and outlet conduits of the insert body).

A method of fabricating a pyrotechnic-actuated valve assembly may include forming an insert body of a first alloy so as to have an inlet, an outlet, and a flow path extending from the inlet to the outlet. In addition, the method may include forming a shear structure of a second alloy. Furthermore, the method may include bonding the shear structure to the outlet of the insert body so as to close the flow path. The second alloy of the shear structure is bonded to the first alloy of the insert body so as to form a hermetic seal.

The forming the shear structure and the bonding the shear structure may be performed simultaneously. In addition, the shear structure may be formed with a powder of the second alloy. Thus, in one example, 3D printing may be used to form the shear structure onto the insert body. In another instance, hot isostatic pressing may be used to form the shear structure onto the insert body.

The method of fabricating may further include forming a cladding of a third alloy so as to line the flow path of the insert body. The third alloy has a higher resistance to corrosion than the first alloy and the second alloy. The third alloy may be applied uniformly to inhibit dissimilar materials corrosion.

A method of actuating a valve assembly may include triggering a pyrotechnic device in response to a control signal. In addition, the method may include striking a shear structure that is bonded to an outlet of an insert body so as to displace the shear structure along a grain boundary between the shear structure and the insert body to open a flow path within the insert body without deforming the insert body.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims The accompanying drawings are not to be considered as drawn to scale unless explicitly noted. For purposes of clarity, various dimensions of the drawings may have been exaggerated.

DETAILED DESCRIPTION

Figure 1:
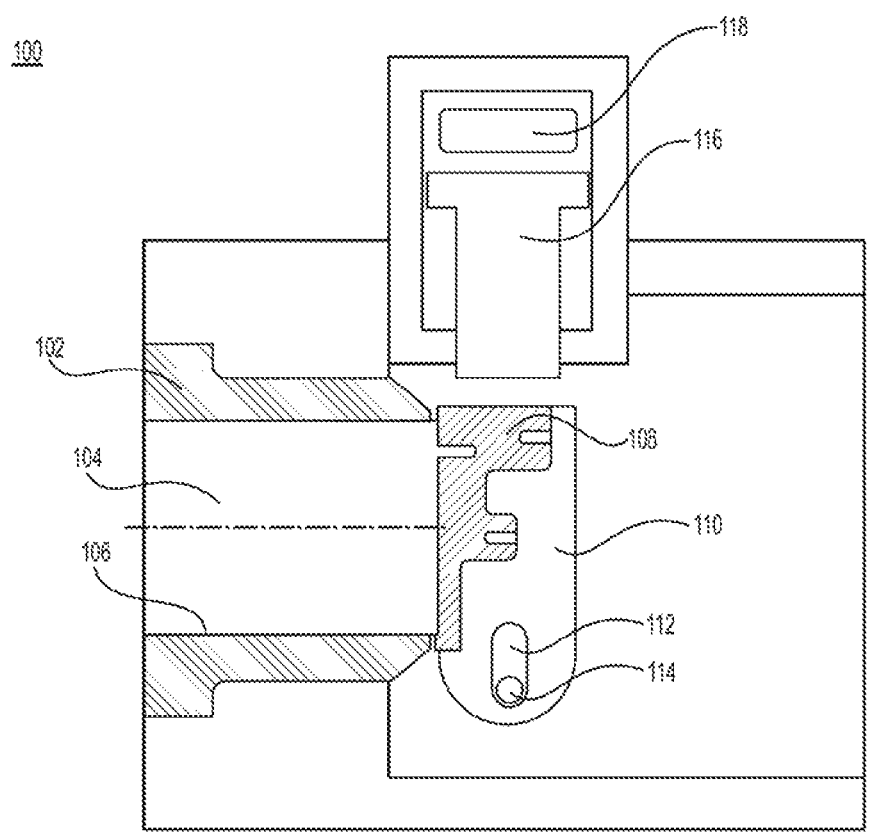
FIG. 1 is a schematic view of a pyrotechnic-actuated valve assembly prior to actuation according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish One element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated. features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate strictures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a schematic view of a pyrotechnic-actuated valve assembly prior to actuation according to an example embodiment. The pyrotechnic-actuated valve assembly 100 may be applied to a safety system of a nuclear power plant. However, it should be understood that the pyrotechnic-actuated valve assembly 100 may also be used in other situations and environments. Referring to FIG. 1, the pyrotechnic-actuated valve assembly 100 includes an insert body 102 having an inlet, an outlet, and a flow path 104 extending from the inlet to the outlet. The insert body 102 is formed of a first alloy. A shear structure 108 is bonded to the outlet of the insert body 102 so as to close the flow path 104. The shear structure 108 is formed of a second alloy. The second alloy of the shear structure 108 is bonded to the first alloy of the insert body 102 so as to form a hermetic seal. The insert body 102 may be in the form of a primary conduit or a nipple, and the shear structure 108 may be in the form of a shear cap.

While the principles herein may be applied a variety of pyrotechnic-actuated valves, the teachings are particularly beneficial for large-bore valves, wherein valves with outer diameters of more than 2 inches are understood by those of ordinary skill in the art to be large-bore valves. In this regard, the insert body 102 has an outer diameter (non-flange portion) that is larger than 2 inches according to an example embodiment. In another instance, the outer diameter of the insert body 102 may be larger than 6 inches, 8 inches, or even 14 inches.

During actuation, an energy impulse is used to shear the shear structure 108 from the insert body 102 so as to open the pyrotechnic-actuated valve assembly 100. To facilitate a clean shear during actuation, the materials used to form the insert body 102 and the shear structure 108 should be sufficiently hard to permit the energy impulse to be transmitted around the intended fracture interface in a near instantaneous manner and with minimal absorption. In such an instance, the energy impulse will cause an almost simultaneous separation of the interfacial surfaces of the insert body 102 and the shear structure 108. Otherwise, the longer the amount of time spanning from the initiation and completion of the shearing action (e.g., the slower the propagation of the fracture following the energy impulse), the more material deformation and macroscopic tearing that is likely to occur. While the above consequence may not be of particular issue for small-bore valves, the effect will be more pronounced for large-bore valves due to the increased distance from the point of impact of the energy impulse to the extremities of the interface between the insert body 102 and the shear structure 108.

To overcome the above drawbacks, a dual-alloy approach is used in connection with the pyrotechnic-actuated valve assembly 100. Notably, the insert body 102 is formed of a first alloy, while the shear structure 108 is formed of a different second alloy. The first alloy and the second alloy are relatively hard materials that are also sufficiently distinct from each other (e.g., by crystal structure geometry and/or lattice dimensions) to facilitate the generation of a relatively clean fracture plane at or immediately adjacent to the interface of the insert body 102 and the shear structure 108 during actuation. In addition, to help focus the energy impulse on the shear zone, the outer surface of the insert body 102 at its outlet may be tapered to decrease a contact area with the shear structure 108.

In a non-limiting embodiment, the first alloy may have a body-centered cubic (BCC) crystal structure. For example, the first alloy may be a ferritic or martensitic iron-based alloy, such as 400 series stainless steel (or other hardenable high-strength martensitic stainless steel alloy). The first alloy may also be a high-strength low-alloy steel. In another instance, the first alloy may be an austenitic nickel-chromium-based alloy, such as an Inconel alloy (or other high-strength nickel alloy).

The second alloy is harder than the first alloy. In a non-limiting embodiment, the second alloy may have a face-centered cubic (FCC) crystal structure. When the pyrotechnic-actuated valve assembly 100 is used in a nuclear reactor environment, it is beneficial for the second alloy to free of cobalt in order to reduce or avoid exposure concerns. The second alloy may be an austenitic iron-based alloy containing at least 0.5 weight percent nitrogen. To obtain the second alloy, an austenitic iron-based alloy may be used as a base material and super saturated with nitrogen. For example, for the second alloy, NitroMaxx by Electrical Power Research Institute (EPRI) may be used. The second alloy may also be one of the materials disclosed supra for the first alloy, provided that the first alloy and the second alloy are not formed of the same material.

As a result of the first alloy being fused to the second alloy, the interface of the insert body 102 with shear structure 108 will either be weaker (due to misalignment of the crystal structure) or stronger (due to symbiotic strengthening) than the adjacent alloy. In the former situation, a natural fracture plane will be present, and the shearing will occur at the interface during actuation. In the latter situation, a very thin strengthened section will be present at the interface, and the shearing will occur immediately adjacent to the interface during actuation. Thus, in either situation, a relatively clean shear can be achieved during actuation.

A cladding 106 of a third alloy lines the flow path 104 of the insert body 102. The third alloy is not as hard as the first alloy and the second alloy but has a higher resistance to corrosion than the first alloy and the second alloy. The third alloy may be an austenitic iron-based alloy, such as 300 series stainless steel (e.g., 308 SS, 316 SS).

A piston 116 is configured to strike and displace the shear structure 108 to open the flow path 104. The piston 116 is configured to be set in motion by a pyrotechnic device 118, which can be triggered manually by an individual or automatically (and remotely) by a control system. To mitigate or prevent the possibility of obstructing the flow path 104, a stopper may be provided to limit the distance that the piston 116 will protrude after detonation of the pyrotechnic device 118. In lieu of or in addition to the stopper, a spring may also be provided to bias the piston 116 away from the flow path 104 after striking the shear structure 108. For example, when installed, the lower ram portion of the piston 116 may extend through the spring with the head portion of the piston 116 resting on the spring. As a result, upon detonation of the pyrotechnic device 118, the piston 116 will be driven to strike the shear structure 108 and simultaneously compress the spring. Immediately after, the piston 116 will be lifted up and away from the flow path 104 by the decompression of the spring.

A retaining structure 110 may be secured to the shear structure 108 in order to control a post-actuation motion and position of the shear structure 108. The retaining structure 110 may include a slot 112 that is engaged with a pin 114. The pin 114 may be mounted in the vicinity of the insert body 102 and is configured to remain stationary, while the retaining structure 110 (to which the shear structure 108 is secured) is configured to have some axial and angular mobility about the pin 114 via the slot 112 after actuation.

The retaining structure 110 may optionally be secured to the insert body 102 as well as the shear structure 108. In such a non-limiting embodiment, the retaining structure 110 is configured to permit a displacement of the shear structure 108 while maintaining a connection to the insert body 102. Alternatively, the retaining structure 110 may be omitted, and a recess or pocket may be provided to receive the shearing structure 108 after actuation.

Figure 2:
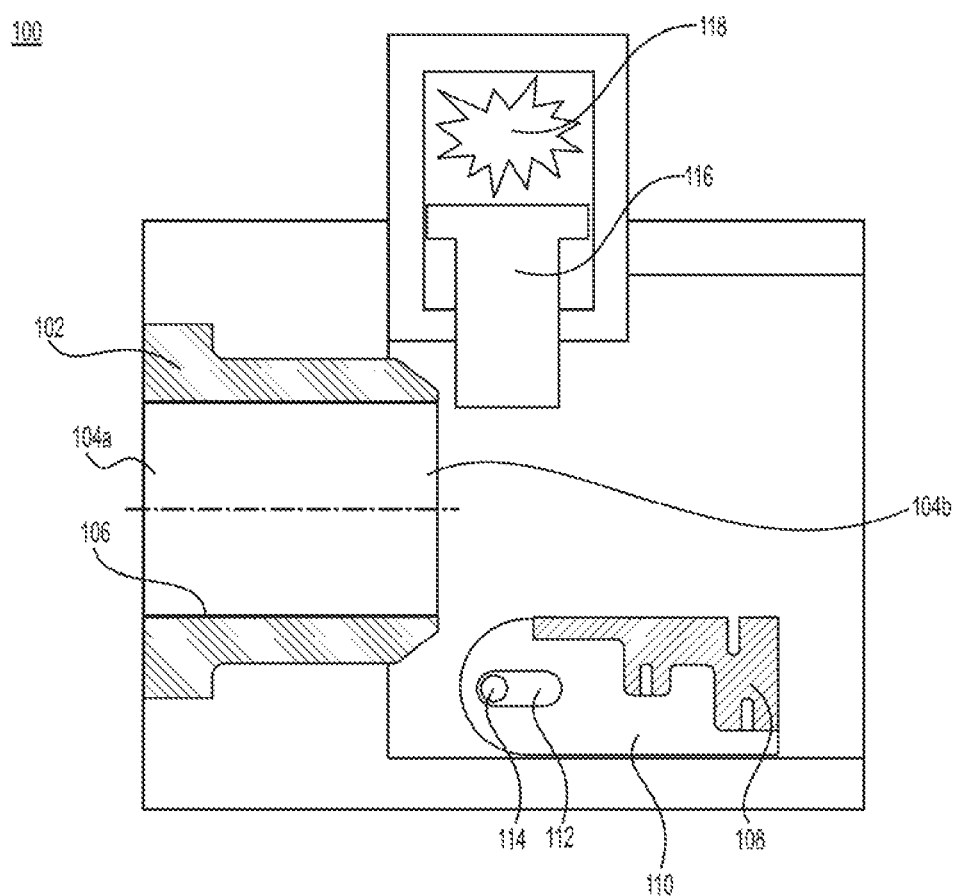
FIG. 2 is a schematic view of the pyrotechnic-actuated valve assembly of FIG. 1 after actuation according to an example embodiment.

FIG. 2 is a schematic view of the pyrotechnic-actuated valve assembly of FIG. 1 after actuation according to an example embodiment. Referring to FIG. 2, the detonation of the pyrotechnic device 118 drives the piston 116 to strike the shear structure 108. As a result, the shear structure 108 will be sheared from the insert body 102 at or immediately adjacent to the interface of the first alloy and the second alloy, thereby breaking the intergranular metallic bonds therebetween in. the process. In this regard, any tearing will be limited to those on a microscopic scale (as opposed to those on a macroscopic scale as in the conventional art).

The slot 112 in the retaining structure 110 permits an axial motion by the shear structure 108 to facilitate the shearing action. The slot 112 also permits an angular motion such that the retaining structure 110 (to which the shear structure 108 is secured) will swing down to open the flow path 104 once the shear structure 108 is separated from the insert body 102. As a result, a flow can occur through the insert body 102 from the inlet 104a to the outlet 104b (e.g., for depressurization). As showy in FIG. 2, the pyrotechnic-actuated valve assembly 100 may be configured such that, after actuation, the piston 116 and the shear structure 108 will not protrude into the flow path 104. In particular, the lower surface of the piston 116 may be at or above the level of the upper bounds of the flow path 104 defined by the insert body 102. Additionally, the upper surface of the shear structure 108 (FIG. 2) may be at or below the level of the lower bounds of the flow path 104 defined by the insert body 102.

Figure 3:
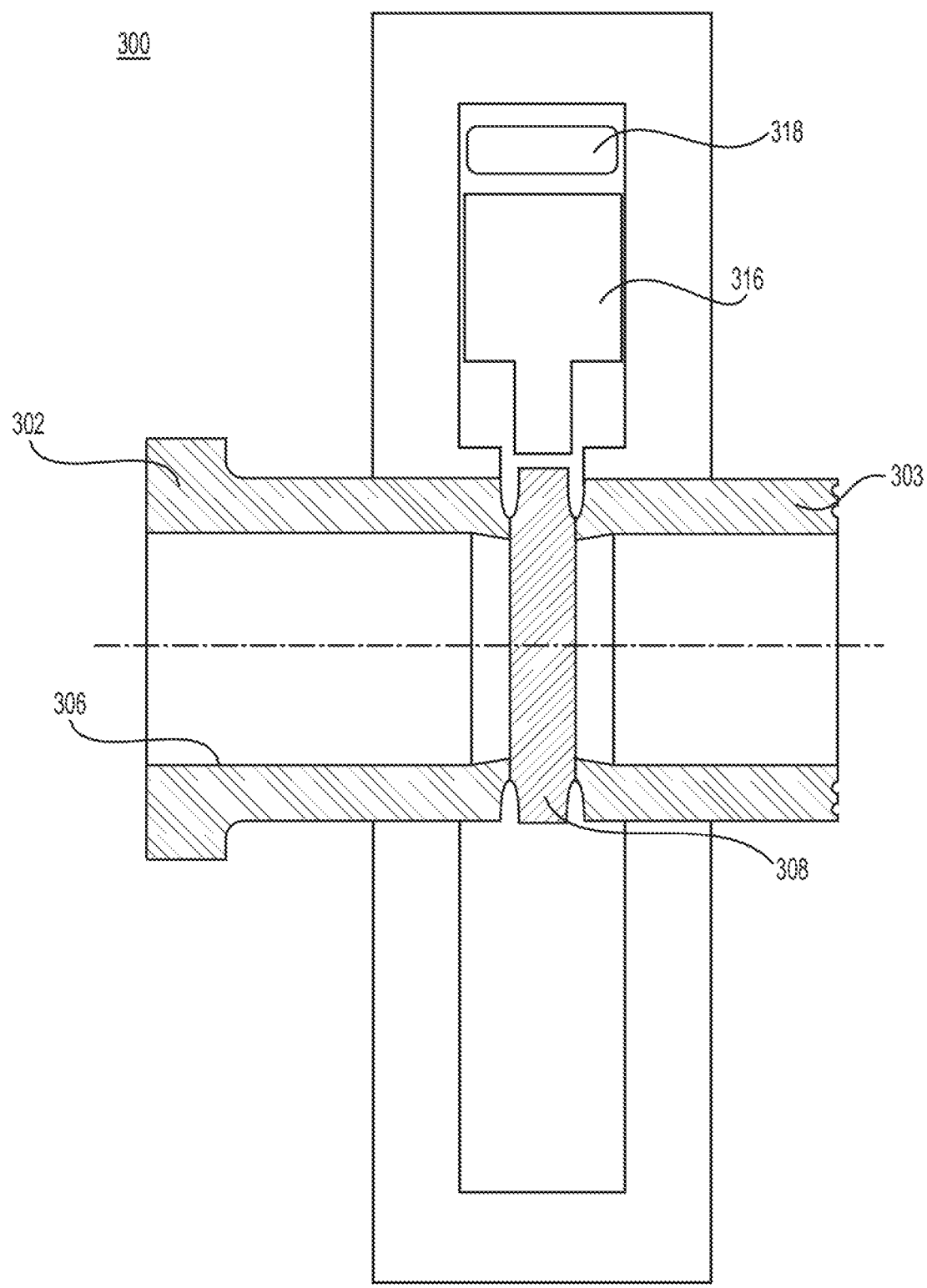
FIG. 3 is a schematic view of another pyrotechnic-actuated valve assembly prior to actuation according to an example embodiment.

FIG. 3 is a schematic view of another pyrotechnic-actuated valve assembly prior to actuation according to an example embodiment. Referring to FIG. 3, the pyrotechnic-actuated valve assembly 300 includes an insert body including a first conduit section 302 (e.g., inlet nozzle) and a second conduit section 303 (e.g., outlet nozzle). The shear structure 308 is a shear plug that is between the first conduit section 302 and the second conduit section 303 of the insert body so as to close the flow path. In particular, the shear structure 308 may be regarded as being bonded/fused to the outlet of the first conduit section 302 and bonded/fused to the inlet of the second conduit section 303. The first conduit section 302 and the second conduit section 303 of the insert body are formed of a first alloy, while the shear structure 308 is formed of a different second alloy. The second alloy of the shear structure 308 is bonded to the first alloy of the first conduit section 302 and the second conduit section 303 of the insert body so as to form a hermetic seal. The first alloy, the second alloy, and their bonding/fusion to each other are as described supra in connection with FIGS. 1-2.

A cladding 306 of a third alloy lines the flow path defined by the first conduit section 302 and the second conduit section 303 of the insert body. The third alloy is as described supra in connection with FIGS. 1-2.

A piston 316 is configured to strike and displace the shear structure 308 to open the flow path. The piston 316 is configured to be set in motion by a pyrotechnic device 318, which can be triggered manually by an individual or automatically (and remotely) by a control system. To mitigate or prevent the possibility of obstructing the flow path, the length of the ram portion of the piston 316 may be adjusted to limit the distance that the piston 316 will protrude after detonation of the pyrotechnic device 318.

Figure 4:
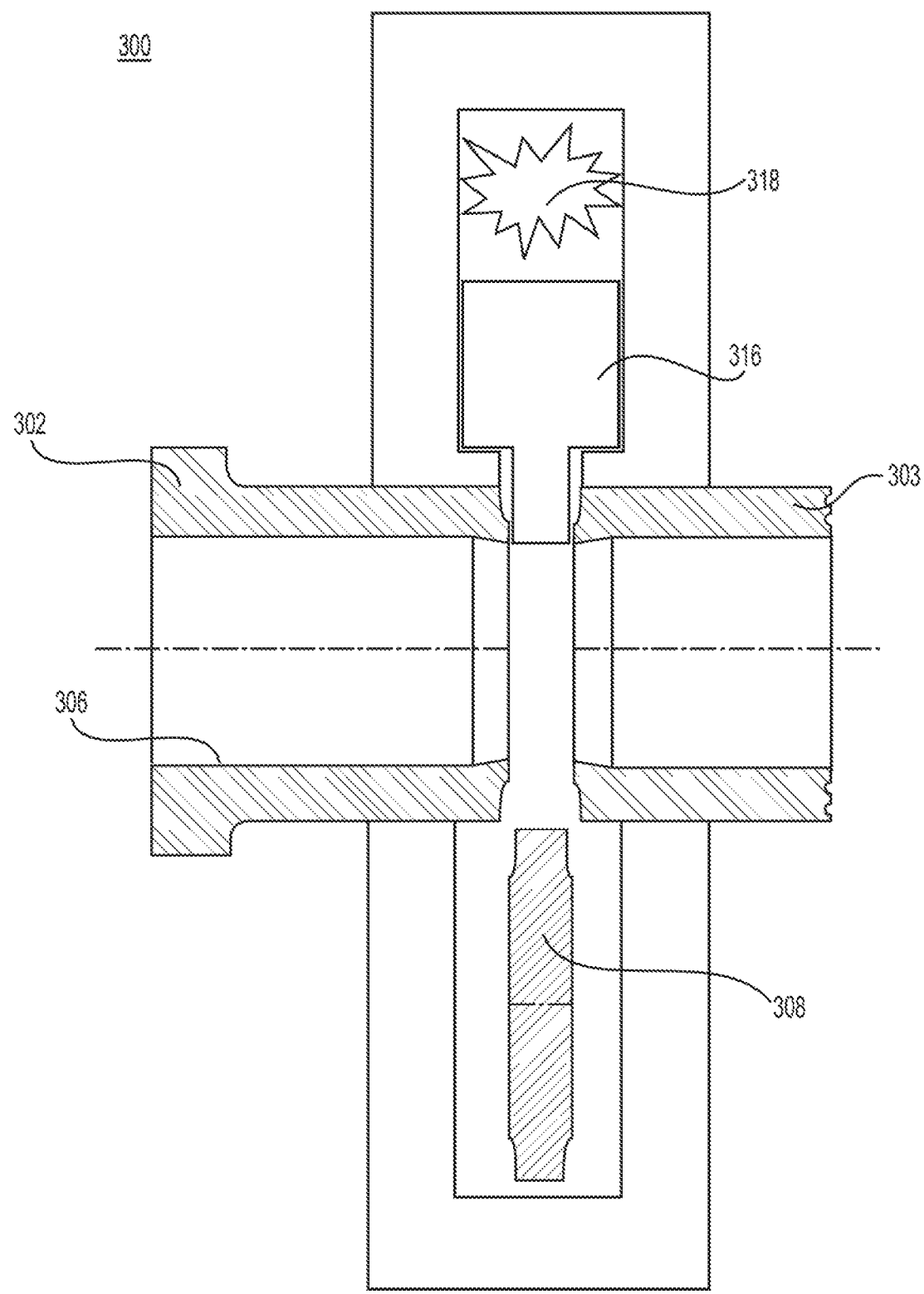
FIG. 4 is a schematic view of the pyrotechnic-actuated valve assembly of FIG. 3 after actuation according to an example embodiment.

FIG. 4 is a schematic view of the pyrotechnic-actuated valve assembly of FIG. 3 after actuation according to an example embodiment. Referring to FIG. 4, the detonation of the pyrotechnic device 318 drives the piston 316 to strike the shear structure 308. As a result, the shear structure 308 will be sheared from the insert body at or immediately adjacent to the interface of the first alloy and the second alloy, thereby breaking the atomic bonds therebetween in the process. As a result, a flow can occur through the first conduit section 302 and the second conduit section 303 of the insert body.

The example embodiment shown in FIGS. 1-2 may be regarded as a depressurization valve (DIV) with a shear cap pressure boundary and external pyrotechnic actuation. On the other hand, the example embodiment shown in FIGS. 3-4 may be regarded as a pyrotechnic block valve (PBV) with a shear plug inner body and sealed pyrotechnic actuation for fluid boundary integrity.

A method of fabricating a pyrotechnic-actuated valve assembly includes forming an insert body of a first alloy so as to have an inlet, an outlet, and a flow path extending from the inlet to the outlet. In addition, the method includes forming a shear structure of a second alloy. Furthermore, the method includes bonding the shear structure to the outlet of the insert body so as to close the flow path. The second alloy of the shear structure is bonded to the first alloy of the insert body so as to form a hermetic seal. The hermetic seal is capable of withstanding at least 1,500 pounds per square inch (psi) of normal operating pressure and may be designed for greater operating pressures.

The forming the shear structure and the bonding the shear structure may be performed simultaneously. In addition, the shear structure may be formed with a powder of the second alloy. A laser may be used to melt the powder so as to create the shear structure layer by layer on the insert body. Heat surd pressure may also be used to fuse the powder to form the shear structure on the insert body. Thus, in one example, 3D printing (or additive manufacturing) may be used to form the shear structure onto the insert body. In another instance, hot isostatic pressing may be used to form the shear structure onto the insert body.

The method may further include forming a cladding of a third alloy so as to line the flow path of the insert body, wherein the third alloy has a higher resistance to corrosion than the first alloy and the second alloy. The cladding may be formed prior to or after the formation of the shear structure.

A method of actuating a valve assembly may include triggering a pyrotechnic device in response to a control signal. In addition, the method may include striking a shear structure that is bonded to an outlet of an insert body so as displace the shear structure along a grain boundary bet Seri the shear structure and the insert body to open a flow path within the insert body without deforming the insert body.

The dual-alloy approach discussed herein provides a relatively clean flow path after the shearing action to open the pyrotechnic-actuated valve assembly. Consequently, there is a negligible impact on the loss coefficient. Furthermore, the dual-alloy approach allows the energy level of the impulse needed for actuation to be more predictable.

While a number of example embodiments have been disclosed herein, it should be understood that other variations may be possible. Such variations are riot to he regarded as a departure from the spirit and scope of the present disclosure, and all such modifications as would be obvious to one skilled in the art are intended to be included within the scope of the following claims.

The invention claimed is:

1. A pyrotechnic-actuated valve assembly, comprising:
an insert body having an inlet, an outlet, and a flow path extending from the inlet to the outlet, the insert body formed of a first alloy; and
a shear structure bonded to the outlet of the insert body so as to close the flow path, the shear structure formed of a second alloy, the second alloy of the shear structure being bonded to the first alloy of the insert body so as to form a hermetic seal along a grain boundary between the shear structure and the insert body, the grain boundary configured to be a fracture interface during an actuation of the pyrotechnic-actuated valve assembly.

2. The pyrotechnic-actuated valve assembly of claim 1, wherein the insert body is tapered at the outlet to decrease a contact area with the shear structure.

3. The pyrotechnic-actuated valve assembly of claim 1, wherein the insert body has an outer diameter that is larger than 2 inches.

4. The pyrotechnic-actuated valve assembly of claim 1, wherein the first alloy and the second alloy have different crystal structures.

5. The pyrotechnic-actuated valve assembly of claim 1, wherein the first alloy and the second alloy have different lattice constants.

6. The pyrotechnic-actuated valve assembly of claim 1, wherein the second alloy is harder than the first alloy.

7. The pyrotechnic-actuated valve assembly of claim 1, wherein the second alloy is free of cobalt.

8. The pyrotechnic-actuated valve assembly of claim 1, wherein the second alloy contains at least 0.5 weight percent nitrogen.

9. The pyrotechnic-actuated valve assembly of claim 1, further comprising:
a cladding of a third alloy lining the flow path of the insert body, the third alloy having a higher resistance to corrosion than the first alloy and the second alloy.

10. The pyrotechnic-actuated valve assembly of claim 1, further comprising:
a piston configured to strike and displace the shear structure to open the flow path.

11. The pyrotechnic-actuated valve assembly of claim 1, further comprising:
a retaining structure secured to the shear structure, the retaining structure configured to permit a displacement of the shear structure while controlling a post-actuation motion and position of the shear structure.

12. The pyrotechnic-actuated valve assembly of claim 1, wherein the insert body is in a form of a nipple, and the shear structure is in a form of a shear cap.

13. A method of fabricating a pyrotechnic-actuated valve assembly, comprising:

forming an insert body of a first alloy so as to have an inlet, an outlet, and a flow path extending from the inlet to the outlet;

forming a shear structure of a second alloy; and bonding the shear structure to the outlet of the insert body so as to close the flow path, the second alloy of the shear structure being bonded to the first alloy of the insert body so as to form a hermetic seal along a grain boundary between the shear structure and the insert body, the grain boundary configured to be a fracture interface during an actuation of the pyrotechnic-actuated valve assembly.

14. The method of claim 13, wherein the forming a shear structure and the bonding the shear structure are performed simultaneously.

15. The method of claim 13, wherein the forming a shear structure is performed with a powder of the second alloy.

16. The method of claim 13, wherein the bonding is performed by 3D printing the shear structure onto the insert body.

17. The method of claim 13, further comprising:

forming a cladding of a third alloy so as to line the flow path of the insert body, the third alloy having a higher resistance to corrosion than the first alloy and the second alloy.

18. A method of actuating a valve assembly, comprising:

triggering a pyrotechnic device in response to a control signal; and striking a shear structure that is bonded to an outlet of an insert body so as to displace the shear structure along a grain boundary between the shear structure and the insert body to open a flow path within the insert body without deforming the insert body.

* * * * *